(12) United States Patent
Young et al.

(10) Patent No.: US 6,431,633 B1
(45) Date of Patent: Aug. 13, 2002

(54) COVER FOR A PICKUP TRUCK BED

(76) Inventors: David C. Young, 1829 7th Ave. NE., Thompson, ND (US) 58278; Lon N. Brorson, 1426 S. 15th St., Grand Forks, ND (US) 58201

( * ) Notice: Subject to any disclaimer, the term of this patent is extended or adjusted under 35 U.S.C. 154(b) by 0 days.

(21) Appl. No.: 09/704,398

(22) Filed: Nov. 2, 2000

(51) Int. Cl.[7] .................................................. B60P 7/02
(52) U.S. Cl. ............ 296/100.02; 296/100; 296/100.06; 296/100.07
(58) Field of Search ................... 296/100.02, 100.03, 296/100.04, 100.05, 100.06, 100.07, 100.09, 100.1, 901, 100; 52/23

(56) References Cited

U.S. PATENT DOCUMENTS

| | | | |
|---|---|---|---|
| 1,613,286 A | | 1/1927 | Odquist |
| 2,989,340 A | * | 6/1961 | Penner ........................ 296/100 |
| 3,151,908 A | | 10/1964 | Horst .......................... 296/100 |
| D213,361 S | | 2/1969 | Gardner ........................ D14/27 |
| 3,572,821 A | | 3/1971 | Van Antwerp ............... 296/137 |
| 3,785,698 A | * | 1/1974 | Dean et al. ................... 296/100 |
| 3,923,334 A | * | 12/1975 | Key ............................. 296/100 |
| 4,073,998 A | | 2/1978 | O'Connor .................... 428/310 |
| 4,205,111 A | | 5/1980 | Pip et al. ..................... 428/215 |
| 4,261,611 A | * | 4/1981 | Barry et al. .................. 296/100 |
| 4,292,369 A | | 9/1981 | Ohashi et al. ................ 428/313 |
| 4,813,735 A | | 3/1989 | Avitable ....................... 296/100 |
| 4,909,561 A | * | 3/1990 | Lovaas ........................ 296/100 |
| D310,987 S | | 10/1990 | Law et al. ................... D12/156 |
| 5,007,670 A | * | 4/1991 | Wise .......................... 296/39.1 |
| 5,036,775 A | | 8/1991 | Snead ......................... 105/377 |
| 5,294,016 A | | 3/1994 | Crenshaw .................... 220/380 |
| 5,322,336 A | * | 6/1994 | Isler ............................ 296/100 |
| 5,505,153 A | * | 4/1996 | Veazey ........................ 296/157 |
| 5,632,522 A | * | 5/1997 | Gaitan et al. ................ 296/100 |
| 5,743,586 A | * | 4/1998 | Nett ............................ 296/100 |
| D403,292 S | | 12/1998 | Bogard ........................ D12/401 |
| 5,954,382 A | * | 9/1999 | Combs ..................... 296/100.06 |
| 6,007,137 A | * | 12/1999 | Lambden ................. 296/100.02 |
| 6,042,173 A | * | 3/2000 | Nett ........................ 296/100.06 |
| 6,079,766 A | * | 6/2000 | Butler et al. ................. 296/901 |
| 6,217,102 B1 | * | 4/2001 | Lathers .................... 296/100.07 |

* cited by examiner

*Primary Examiner*—Kiran B. Patel
(74) *Attorney, Agent, or Firm*—Thomte, Mazour & Niebergall; Dennis L. Thomte

(57) ABSTRACT

A cover is disclosed for a pickup truck bed with the cover being comprised of upper and lower metal sheet members secured at their edges to define a compartment therebetween which is preferably filled with a foam strengthening material. Preferably, the sheet members are constructed of an aluminum material.

10 Claims, 3 Drawing Sheets

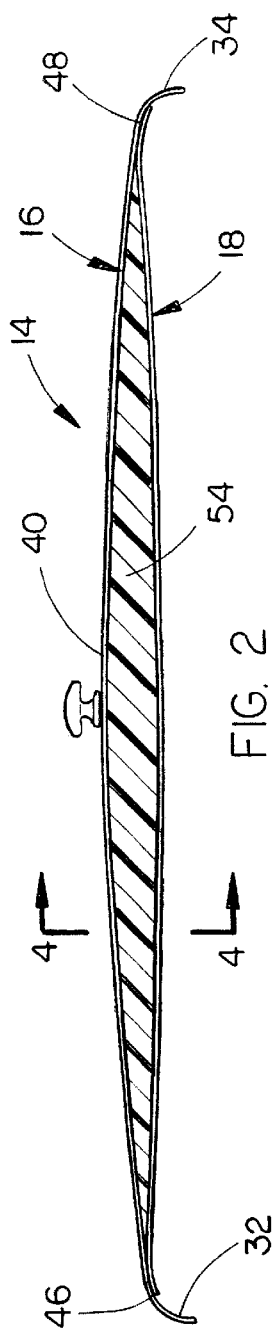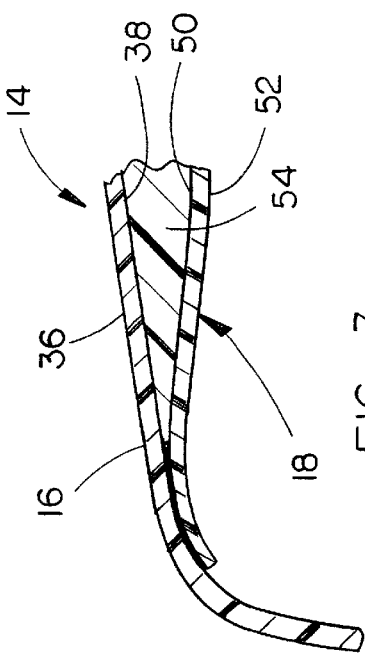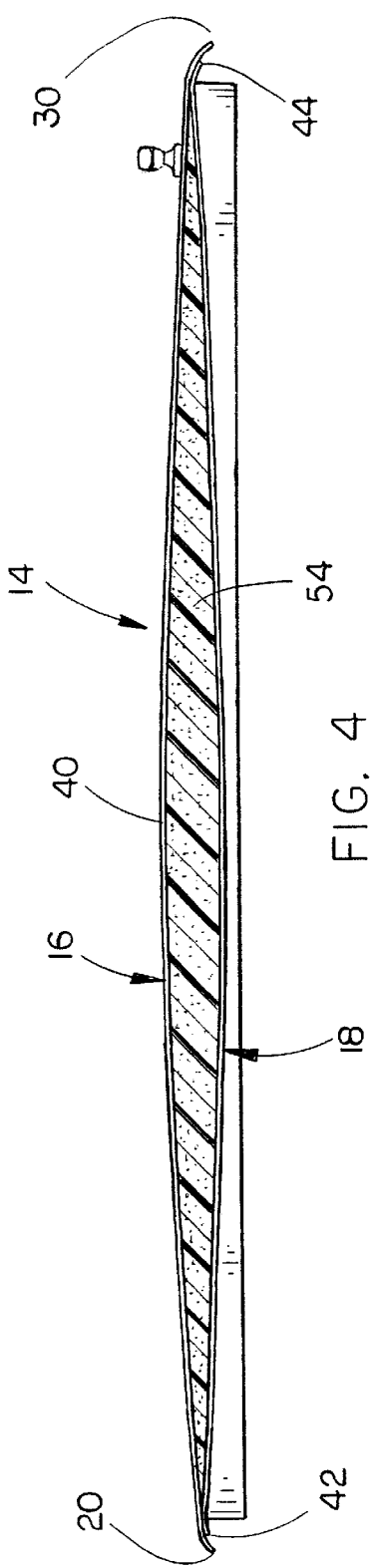

COVER FOR A PICKUP TRUCK BED

BACKGROUND OF THE INVENTION

1. Field of the Invention

This invention relates to a cover for a pickup truck bed and more particularly to a cover for a pickup truck bed which comprises upper and lower metal sheet members joined together at the edges thereof and which a define compartment therebetween. In the preferred embodiment, the compartment is filled with a strengthening foam.

2. Description of the Related Art

Covers or lids for pickup truck beds are commonly used which are extended over the upper end of a truck bed to provide a safe and dry cargo area. Traditionally, the covers or lids are constructed of a plastic material or a fiberglass material. The plastic and fiberglass covers are affected by the elements and tend to fade over time and sometimes are chipped through use. Additionally, the conventional plastic or fiberglass covers are quite heavy. In those cases where metal is used for the covers, it is necessary to weld the same.

SUMMARY OF THE INVENTION

A cover is disclosed for a pickup truck bed having an upstanding front wall, upstanding opposite side walls, and a tailgate which is movable between open and closed positions. The cover of this invention comprises an upper metal sheet member having a front edge, opposite side edges, and a rear edge with the upper sheet member having an upper surface and a lower surface. The cover also includes a lower metal sheet member having a front edge, opposite side edges, and a rear edge, with the lower sheet member having an upper surface and a lower surface. The upper surface of the front edge of the lower sheet member is glued to the lower surface of the front edge member of the upper sheet member. The upper surfaces of the side edges of the lower sheet member are glued to the lower surfaces of the side edges of the upper sheet member. The upper surface of the rear edge of the lower sheet member is glued to the lower surface of the rear edge of the upper sheet member. The upper sheet member has an upwardly domed central portion with the upper and lower sheet members defining a compartment therebetween with the compartment being preferably filled with a strengthening foam. Preferably, the metal sheet members are comprised of an aluminum material. Although the preferred embodiment utilizes glue to secure the sheet members together, the sheet members could be secured together by welding or other mechanical means. In a modified form of the invention, an expansion bead is formed in the lower sheet member adjacent each of its side edges.

It is therefore a principal object of the invention to provide an improved cover for a pickup truck bed.

A further object of the invention is to provide a cover for a pickup truck bed which is comprised of a metal material.

Still another object of the invention is to provide a cover for a pickup truck bed having a dome formed thereon to ensure that the water will run off the cover and will not accumulate in the middle thereof.

Still another object of the invention is to provide a cover for a pickup truck bed which is made of a material which will not be affected by the elements.

Still another object of the invention is to provide a lightweight cover for a pickup truck bed.

Still another object of the invention is to provide a metal cover for a pickup truck bed wherein upper and lower sheet members are preferably glued together rather than being welded.

Still another object of the invention is to provide a cover for a pickup truck bed including upper and lower sheet members which define a compartment therebetween with the compartment being filled with foam to create rigidity in the cover.

Still another object of the invention is to provide a cover for a pickup truck bed which is extremely strong.

These and other objects will be apparent to those skilled in the art.

BRIEF DESCRIPTION OF THE DRAWINGS

FIG. 2 is a sectional view as seen on lines 2—2 of FIG. 1;

FIG. 3 is an enlarged partial sectional view of FIG. 2;

FIG. 4 is a sectional view as seen on lines 4—4 of FIG. 2;

DESCRIPTION OF THE PREFERRED EMBODIMENT

Figure 1:
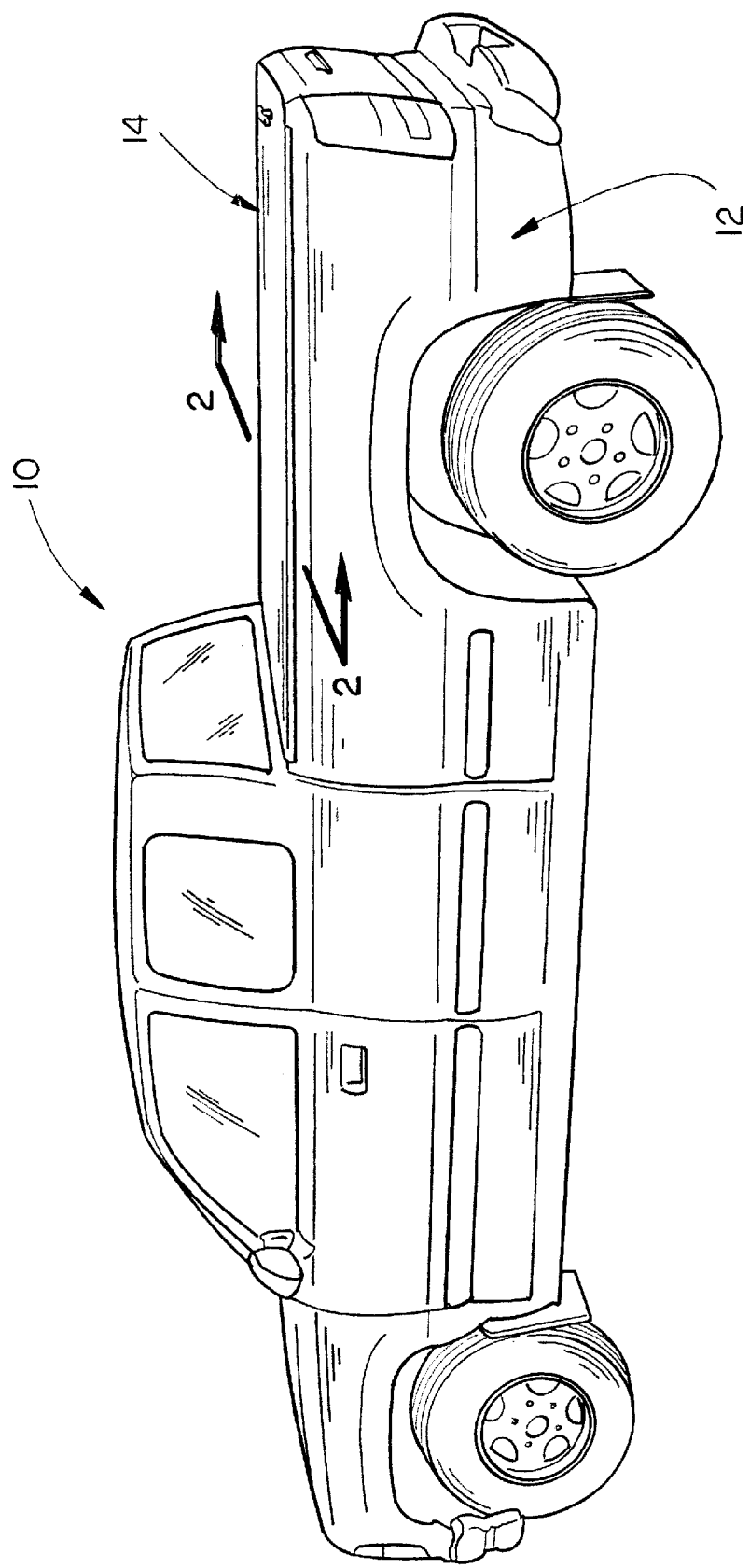
FIG. 1 is a perspective view of a pickup truck having the lid of this invention mounted thereon.

In FIG. 1, the numeral 10 refers to a pickup truck including a bed 12 which includes a conventional upstanding front wall, upstanding side walls, and a tailgate. The numeral 14 refers to the lid of this invention.

Lid 10 includes an upper sheet member 16 and a lower sheet member 18 which are constructed of a metal material which is preferably aluminum. Upper sheet member 16 includes a front edge 20, rear edge 30, and opposite side edges 32 and 34. For purposes of description, upper sheet member 16 will be described as having an upper surface 36 and a lower surface 38. Preferably, upper sheet member 16 has a central domed portion 40 which causes water to drain therefrom and to prevent the accumulation of water thereon. As seen in the drawings, the opposite side edges 32 and 34 extend downwardly and outwardly. Front edge 20 and rear edge 30 also extend downwardly somewhat, but to a lesser degree than the opposite side edges 32 and 34. In many cases, the downwardly extending portion at the front edge of upper sheet member 16 will be omitted.

Lower sheet member 18 includes a front edge 42, rear edge 44, and opposite side edges 46 and 48. For purposes of description, lower sheet member 18 will be described as having an upper surface 50 and lower surface 52.

Lower sheet member 18 is positioned below upper sheet member 16, as illustrated in the drawings, with the upper surfaces of edges 42, 44, 46 and 48 thereof being glued to the lower surfaces of edges 20, 30, 32 and 34, respectively, by a suitable adhesive. Although gluing is preferred, the sheet members could be welded together or secured together by other mechanical fastening means. Preferably, a suitable strengthening foam 54 is injected between the upper sheet member 16 and lower sheet member 18 to fill the compartment between sheet members 16 and 18. The foam material creates a truss-style strengthening system when the foam is used between the sheet members 16 and 18. The foam also creates rigidity for the cover. In some situations, it may be necessary to utilize some sort of truss structure between the sheet members to prevent warping of the cover in extremely hot temperatures. In those situations, the foam may not be required.

The lid 14 of this invention is quite lightweight and which will have a weight of approximately 35–75 pounds. The use of the aluminum sheet members 16 and 18 provides a cover or lid which will keep the contents in the truck bed dry and secure. The construction of the lid 14 is such that it will not be affected by the elements. Further, the sheet members 16 and 18 may be formed to fit specific models of pickup trucks. The use of glue to secure the sheet members 16 and 18 together eliminates the need for welding the sheet members together, although welding may be employed if necessary or desirable. The lid or cover of this invention is extremely strong and will be many times stronger than fiberglass or plastic.

Figure 5:
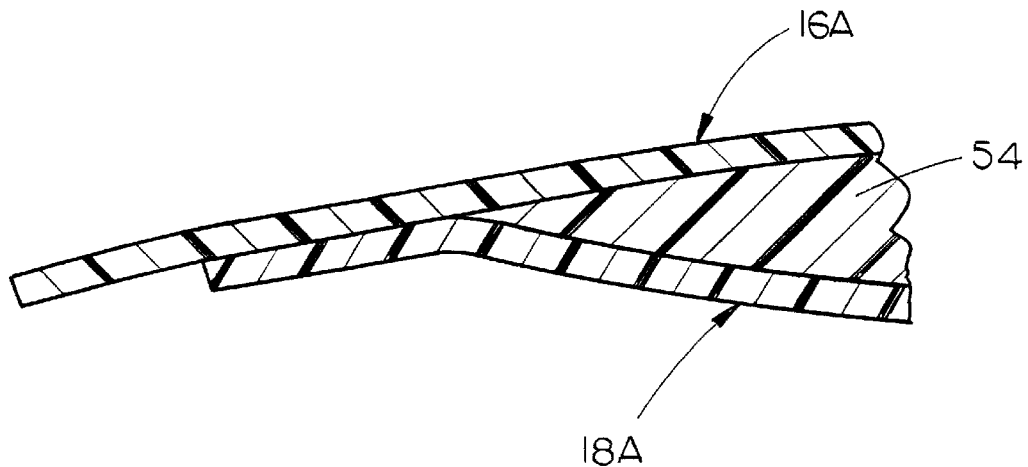
FIG. 5 is a view similar to FIG. 3 except that a modified embodiment is shown.

FIG. 5 illustrates an embodiment wherein the side edges of the upper sheet member 16A and the lower sheet member 18A are straight, rather than being arcuate.

Figure 6:
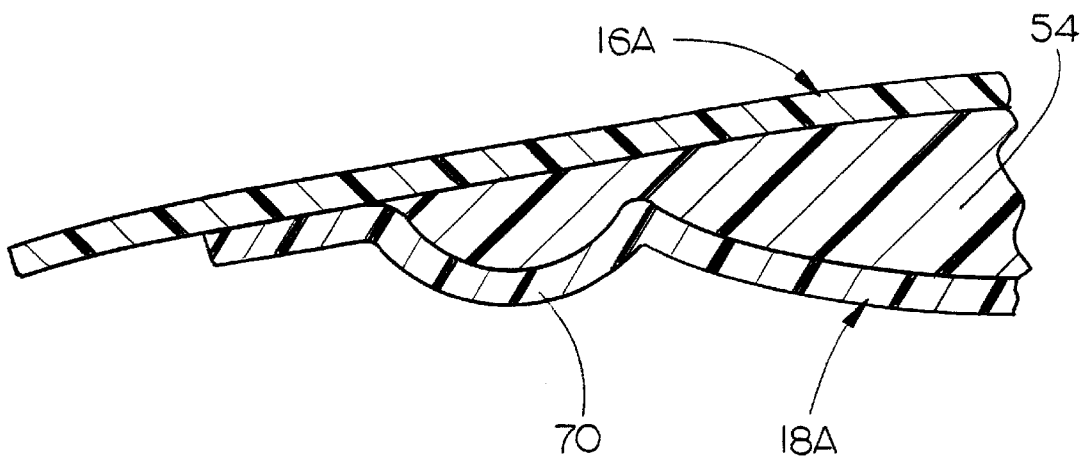
FIG. 6 is a view similar to FIG. 3 except that a further modified embodiment is shown.

FIG. 6 illustrates a further embodiment wherein an expansion bead 70 is formed in lower sheet member 18A adjacent each of the sides thereof.

Thus it can be seen that the invention accomplishes at least all of its stated objectives.

We claim:

1. A cover for a pickup truck bed having an upstanding front wall, upstanding opposite side walls, a tail gate movable between an open position and an upstanding closed position, and a bed interior, the cover comprising:

an upper sheet member having a front edge, opposite side edges, and a rear edge;

each of said opposite side edges of said upper sheet member extending downwardly and outwardly to define an arcuate portion which terminates in a lower edge;

said upper sheet member having an upper surface and a lower surface;

a lower sheet member having a front edge, opposite side edges, and a rear edge;

said lower sheet member having an upper surface and a lower surface;

each of said opposite side edges of said lower sheet member extending downwardly and outwardly to define an arcuate portion which terminates in a lower edge;

said upper surface of said front edge of said lower sheet member being secured to said lower surface of said upper sheet member adjacent the said front edge thereof;

said arcuate portions of said side edges of said lower sheet member being positioned adjacent said arcuate portions of said side edges of said upper sheet member so that said lower edges of said arcuate portions of said lower sheet member are positioned above said lower edges of said arcuate portions of said upper sheet members, means securing the arcuate portions of said upper and lower sheet members together;

said upper surface of said rear edge of said lower sheet member being secured to said lower surface of said upper sheet member adjacent the said rear edge thereof.

2. The cover of claim 1 wherein said upper sheet member has an upwardly domed central portion.

3. The cover of claim 1 wherein said upper and lower sheet members define a compartment therebetween and wherein said compartment is filled with a strengthening foam.

4. The cover of claim 1 wherein said rear edge of said upper sheet member has a downwardly extending portion.

5. The cover of claim 4 wherein said upper surface of said lower sheet member is secured, adjacent its rear edge, to said lower surface of said upper sheet member adjacent said rear edge downwardly extending portion.

6. The cover of claim 1 wherein said lower sheet member is provided with an expansion bead formed therein inwardly of each of the side edges thereof.

7. The cover of claim 1 wherein said upper and lower sheet members are comprised of a metal material and wherein said arcuate portions of said upper and lower sheet members are welded together.

8. The cover of claim 1 wherein said upper and lower sheet members are comprised of a metal material and wherein said arcuate portions of said upper and lower sheet members are adhesively secured together.

9. The cover of claim 1 wherein said arcuate portions of said upper and lower sheet members are adhesively secured together.

10. A cover for a pickup truck bed having an upstanding front wall, upstanding opposite side walls, a tail gate movable between an open position and an upstanding closed position, and a bed interior, the cover comprising:

an upper sheet member having a front edge, opposite side edges, and a rear edge;

each of said opposite side edges of said upper sheet member extending downwardly and outwardly to define a lower edge;

said upper sheet member having an upper surface and a lower surface;

a lower sheet member having a front edge, opposite side edges, and a rear edge;

said lower sheet member having an upper surface and a lower surface;

each of said opposite side edges of said lower sheet member extending downwardly and outwardly to define a lower edge;

said upper surface of said front edge of said lower sheet member being secured to said lower surface of said upper sheet member adjacent the said front edge thereof;

said lower edges of said side edges of said lower sheet member terminating inwardly of said lower edges of said upper sheet member;

said side edges of said lower sheet member being secured to said lower surface of said upper sheet member;

said upper surface of said rear edge of said lower sheet member being secured to said lower surface of said upper sheet member adjacent the said rear edge thereof;

said upper sheet member being of integral one-piece construction;

said lower sheet member being of integral one-piece construction.

* * * * *